United States Patent Office 3,686,004
Patented Aug. 22, 1972

3,686,004
USE OF 1-(PROP-1'-ENYL)-3,4,5-TRIMETHOXY BENZENE TO ALTER THE FLAVOR OF FOOD
Philip De C. Kratz, Rumson, and Henry A. Bondarovich, Howell Township, Monmouth County, N.J., assignors to International Flavors & Fragrances Inc., New York, N.Y.
No Drawing. Filed May 19, 1970, Ser. No. 38,880
Int. Cl. A23l 1/26
U.S. Cl. 99—140 R
7 Claims

ABSTRACT OF THE DISCLOSURE

Foodstuff, flavor augmenting compositions are provided containing a quantity of mono-alkenyl, trialkoxy benzene sufficient to alter the organoleptic characteristics of said composition.

The present invention relates in general to compositions useful in altering the organoleptic characteristics of a foodstuff. More particularly, this invention has to do with the use of mono-alkenyl, trialkoxy benzenes to alter the flavor of foodstuffs.

The term "alter" in its various forms is used herein to mean the supplying or imparting of a flavor character or note to an otherwise bland, relatively tasteless substance, or augmenting the existing flavor characteristic where a natural flavor is deficient in some regard, or supplementing the existing flavor impression to modify its quality, character or taste.

The term "foodstuff" as used herein includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

Reproduction of fresh fruit flavors, particularly berry, such as strawberry, blackberry and the like often proves difficult. In the past, it was found that candies, beverages, dessert foods and the like prepared with artificial or substitute strawberry, peach, blackberry and the like flavors and flavor concentrates were lacking in an important nuance or character found in the fresh fruit itself.

In accordance with this invention, it has been found that novel foodstuff and flavoring compositions having improved fresh fruit flavor and aroma characteristics and woody notes found in the natural fruit material may be provided by the utilization of at least one compound comprising a mono-alkenyl tri- lower-alkoxy benzene, the alkenyl group containing three or four carbon atoms and the lower alkoxy groups being independently selected from lower alkyl of one or two carbon atoms. For convenience, the mono-alkenyl, trialkoxy benzenes contemplated for use in the practice of the present invention can be represented by the following structural formula:

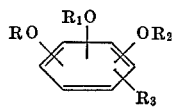

wherein R, $R_1$ and $R_2$ independently represent lower alkyl containing 1 or 2 carbon atoms and $R_3$ represents an alkenyl group containing 3 or 4 carbon atoms.

The preferred mono-alkenyl, trialkoxy benzenes for use in this invention include:

1-[prop-1'-enyl]-3,4,5-trimethoxy benzene
1-[prop-2'-enyl]-3,4,5-trimethoxy benzene
1-[prop-2'-enyl]-3,4,5-triethoxy benzene
1-[prop-2'-enyl]-2,3,5-trimethoxy benzene
1-[prop-2'-enyl]-2,3,6-triethoxy benzene
1-[prop-2'-enyl]-2,4,6-triethoxy benzene
1-[prop-2'-enyl]-2,3,4-triethoxy benzene
1-[prop-2'-enyl]-3,5-dimethoxy-4-ethoxy benzene
1-[prop-2'-enyl]-3,5-diethoxy-4-methoxy benzene
1-[but-2'-enyl]-3,4,5-trimethoxy benzene
1-[but-2'-enyl]-3-methoxy-2,6-diethoxy benzene
1-[but-2'-enyl]-3,4,5-triethoxy benzene
1-[but-1'-enyl]3,4,5-trimethoxy benzene
1-[but-2'-enyl]-2,3,4-trimethoxy benzene
1-[but-2'-enyl]-2,3,5-trimethoxy benzene
1-[but-2'-enyl]-2,3,6-trimethoxy benzene
1-[but-2'-enyl]-2,3,6-triethoxy benzene
1-[but-2'-enyl]-2,4,6-triethoxy benzene
1-[but-2'-enyl]-2,3,4-triethoxy benzene
1-[but-3'-enyl]-3,4,5-trimethoxy benzene.

Each of the foregoing materials provides a sweet, fruity, berry-like acidic flavor and aroma. Such compounds may be employed either singly or in combinations comprising two or more thereof. In this manner the processor is afforded effective means whereby to exploit the beneficial aspects of each of a plurality of mono-alkenyl trialkoxy benzenes in a specific instance. Pure or commercially pure materials are preferred for use herein.

The compounds described herein can suitable be prepared by a number of processes such as alkenylation of a trialkoxy benzene, e.g., 1,2,3-trimethoxy benzene or 1,2,4-trimethoxy benzene with a suitable allylic halide or alkadiene in the presence of $PdCl_2$ or a palladium chloride complex. Suitable allylic halides and alkadienes include: allyl bromide; allyl chloride; 2-butenyl chloride; 1-bromo-2-pentene; 1-chloro-2-pentene; 1,3-butadiene; 1,3-pentadiene; 1,3-hexadiene.

Suitable palladium chloride complex materials include $PdCl_2$ complexes with: benzonitrile and pyridine; benzonitrile and a-picoline; benzonitrile and B-picoline; cinnamonitrile and pyridine.

This particular method enables the preparation of mono-alkenyl trialkoxy benzenes wherein the situs of the carbon-carbon double bond can be varied by choice of alkenylating agent, i.e., alkenyl halide or alkadiene. Thus, alk-2-enyl trialkoxy benzenes can be readily prepared by the use of allyl bromide as the allylic halide reactant. If desired, the alk-1-enyl derivative can be prepared from the alk-2-enyl derivative by treatment with a base such as an alkali metal hydroxide.

A further ramification of the aforedescribed alkenylation process for preparing mixed alkoxy derivatives involves alkenylating a dimethoxy-monohydroxybenzene, e.g., 2,3-diethoxy phenol in the manner described and thereafter etherifying with, for example, dimethyl sulfate to provide the mixed ether product, e.g., 1-(but-2'-enyl)-2-methoxy-3,4-diethoxy benzene.

The mono-alkenyl, trialkoxy benzene compounds of this invention can also be suitably prepared by treatment of a trialkoxy-benzaldehyde with a triphenyl alkyl phosphonium salt having an alkyl group which contains one less carbon atom than the alk-1-enyl side chain. The following reaction is illustrative:

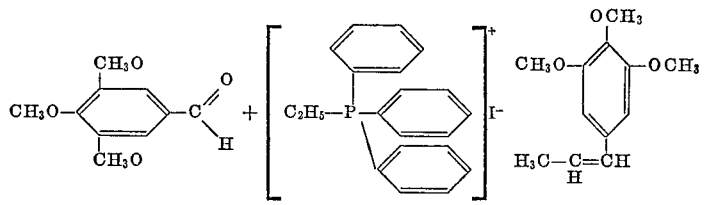

The carbon-carbon double bond in the alk-1-enyl side chain can be moved with agents such as $BH_3$ in anhydrous media, as taught by Brown et al., J. Am. Chem. Soc., vol. 89, p. 567 (Feb. 1, 1967). This rearrangement is illustrated thusly:

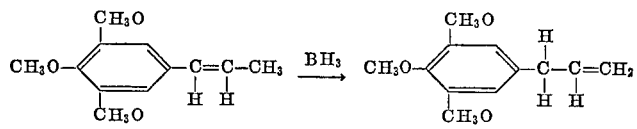

The reaction of the trialkoxy-benzaldehyde with the triphenyl alkyl phosphonium salt is carried out in anhydrous media using an alkyl lithium such as butyl lithium as a "transfer reagent."

Suitable solvents for this reaction include: benzene; tetrahydrofuran; cyclohexane: toluene; n-hexane; and the like. Equimolar ratios of benzaldehyde derivative, phosphonium salt and alkyl lithium are preferred, although the phosphonium salt may be in very slight excess. An excess of aldehyde is avoided to obviate unreacted aldehyde in the final product which would undesirably affect the flavor characteristics of the desired product.

Suitable trialkoxy benzaldehydes for use in the foregoing preparation include:

2,3,4-trimethoxy benzaldehyde:
3,4,5-trimethoxy benzaldehyde;
2,3,5-trimethoxy benzaldehyde;
2,3,4-triethoxy benzaldehyde;
3,4,5-triethoxy benzaldehyde;
2,3,5-triethoxy benzaldehyde;
2,3-dimethoxy-5-ethoxy benzaldehyde.

Triphenyl alkyl phosphonium salts suitable for preparing mono-alkenyl trialkoxy benzene compounds useful in this invention include:

triphenyl phosphonium ethyl iodide;
triphenyl phosphonium propyl iodide;
triphenyl phosphonium n-butyl iodide;
triphenyl phosphonium-2-methyl propyl iodide;
triphenyl phosphonium-3-methyl butyl bromide;
tritolyl phosphonium-ethyl-bromide.

Suitable alkyl lithium transfer reagents include: methyl lithium; propyl lithium; butyl lithium; phenyl lithium; pyridyl lithium; 3-methyl pyridyl lithium; 3-ethyl-phenyl lithium. The resulting alk-1'-enyl trialkoxy benzene can be used as such in the process of this invention or they can be isomerized to alkenyl trialkoxy benzenes wherein the double bond in the alkenyl moiety is situated at a position other than the "1" position.

Suitable isomerization agents in addition to the aforementioned $BH_3$ include acidic anion exchange resins such as Amberlite XE–100, a polystyrene sulfonic acid.

1-(prop-2'-enyl)-3,4,5-trimethoxybenzene, which is a clear, white, viscous liquid having an $n_D^{20}$ of 1.547, can also be isolated from elemi oil by distillation and/or extraction, as described by Visweswara, Rao, Seshadri, Proc. Indian Acad. Sci., 1949, 30A, 114 (Chem. Abstracts, 1950, 44, 5876). The materials produced according to any of these processes can then be further purified as necessary by conventional techniques such as solvent extraction, distillation, fractional crystallization and the like.

The nature of the co-ingredients included with the mono-alkenyl trialkoxy benzene in formulating the product composition will depend primarily upon the ultimate use contemplated, i.e., as a foodstuff per se or alternatively as a flavoring composition adapted to be added subsequently to a foodstuff. Thus, the ingredients selected may be those necessary to prepare a wide variety of products including carbonated and non-carbonated beverages, powders or liquids for use in the preparation of carbonated or non-carbonated beverages, puddings, ice cream, dough cookies, mellorine, gelatin desserts, rock, hard and starch candies, and confections, centers for chocolates, icings, pie fillings, syrups for sundaes, breakfast foods, fruit fillings for pastries and the like. The mono-alkenyl, trialkoxy benzenes can also be utilized in natural fruit products such as strawberry products and the like where the flavor has been weakened in processing or the natural product has a weak flavor which would be benefited by enhancement.

In any event, substances suitable for use herein as coingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditioners, flavorants and flavor intensifiers.

Stabilizer compounds include preservatives, e.g., sodium chloride, antioxidants, e.g. calcium and sodium ascorbate, ascorbic acid, butylated hydroxyanisole (mixture of 2- and 3-tertiary butyl-4-hydroxyanisole), butylated hydroxy toluene (2,6-di-tertiary-butyl-4-methyl phenol), propyl gallate and the like, sequestrants, e.g., citric acid.

Thickener compounds include carriers which can be solvents for the concentrate and the mono-alkenyl trialkoxy benzene such as sugar, syrups and the like, binders, protective colloids, suspending agents, emulsifiers and the like, e.g., agar-agar; carrageenan; cellulose and the cellulose derivatives such as carboxymethyl cellulose and methyl cellulose; natural and synthetic gums such as gum arabic, acacia, guar, karaya, gum tragacanth; gelatin proteinaceous materials; lipids; carbohydrates; starches; pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcunin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferric pyrophosphate, ferrous gluconate and the like, riboflavin, vitamines, zinc sources such as zinc chloride, zinc sulfate and the like.

Flavorants and flavor intensifiers include organic acids, including aliphatic acids, such as 2-methyl-2-pentenoic acid and aromatic acids such as cinnamic acid; alcohols, e.g., primary and secondary alcohols; esters, and preferably lower alkyl esters such as ethyl butyrate, isoamyl butyrate and the like; ethers such as naphthyl ethyl ether; carbonyl compounds including aldehydes such as citral, and ketones including diketones such as diacetyl; lactones, such as decalactone; cyclic organic materials including benzene derivatives; alicyclics, heterocyclics such as furans, particularly 3-acetylfuran, pyridines, pyrazines and the like, sulfur-containing materials including thiazoles, thiols, sulfides, disulfides and the like; so-called flavor potentiators such as monosodium glutamate, guanylates, inosinates, natural and synthetic flavorants such as vanillin, ethyl, vanillin, diacetyl, phenethyl 2-furoate, maltol, natural gums and the like; spices, herbs, essential oils such as oil of cinnamon. Glycidates are well recognized constituents of strawberry, peach and blackberry flavoring materials and are preferred ingredients in this aspect of the invention.

The specific flavoring adjuvant selected for use may be either solid or liquid, depending upon the desired physical form of the ultimate product, i.e., foodstuff, whether simulated or natural, and should, in any event, be capable of providing an environment in which the mono-alkenyl trialkoxy benzene can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of mono-alkenyl trialkoxy benzene employed in a particular instance can vary over a relatively wide range whereby to achieve desired organoleptic effects having reference to the nature of the product. All parts and percentages given herein are by weight unless otherwise specified. Thus, corresponding greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition. Thus, the use of insufficient quantities of the mono-alkenyl trialkoxy benzene will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to foodstuffs, it is found that quantities of mono-alkenyl trialkoxy benzene ranging from a small but effective amount, e.g., 0.5 part per million up to about 25 parts per million by weight based on total composition are suitable.

Thus, large amounts are desired in preparing hard candies, for example, while somewhat smaller quantities suffice with soft candies such as cream fillings, dessert items, such as puddings, gelatin desserts and the like. Thus, with candies and other foods processed at relatively high temperatures, concentrations of from about 5 to 20 parts per million are preferred. With dessert type foods such as gelatin desserts, puddings and the like, concentrations of from about 3 to 10 parts per million are effective. With beverages, concentrations of mono-alkenyl trialkoxy benzene of from about 0.4 to 4 parts per million are suitable. Concentrations in excess of the maximum quantities stated are not normally recommended since they fail to provide commensurate enhancement of organoleptic properties. In those instances wherein the mono-alkenyl trialkoxy benzene is added to the foodstuff as an integral component of a flavoring composition, it is, of course, essential that the total quantity of flavoring composition employed be sufficient to yield an effective mono-alkenyl trialkoxy benzene concentration in the foodstuff product.

Flavoring compositions or concentrates prepared in accordance with the present invention preferably contain the mono-alkenyl trialkoxy benzene in concentrations ranging from about 1 to 20% based on the total weight of said flavoring composition.

The compositions described herein can be prepared according to conventional techniques well known in the art for such purposes. Thus, liquid products can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the mono-alkenyl trialkoxy benzene with, for example, gum arabic, gum tragacanth, carrageenan and the like, and thereafter, spray-drying the resultant mixture whereby to obtain the particulate solid product. Pre-prepared flavor mixes in powder form may be obtained by mixing the dried solid components, e.g., milk solids, sugar and the like and mono-alkenyl trialkoxy benzene in a dry blender until the requisite degree of uniformity is achieved. It is generally preferred to combine the trialkoxy benzene with other adjuvants such as carriers or flavoring ingredients to form flavor concentrates which can then be added either directly to the food or combined with a carrier material and then added to the food. The mono-alkenyl, trialkoxy benzenes are preferably added to the food in conjunction with flavoring ingredients which aid in imparting the desired strawberry, peach or blackberry character to the final food composition.

It is presently preferred to combine with the mono-alkenyl trialkoxy benzene the following flavoring adjuvants: an alkyl phenyl glycidate, 2-methyl-2-pentenoic acid, maltol, ethyl maltol, 2,5 dimethyl-4-hydroxy-2H-furan-3-one, or mixtures thereof.

The mono-alkenyl, trialkoxy benzenes are particularly effective to benefit a wide variety of flavoring materials which require a fresh fruit flavor. Thus, in addition to modifying strawberry, peach or blackberry flavors, it has also been found beneficial to incorporate within the concentration ranges hereinbefore defined, one or more monoalkenyl, trialkoxy benzenes into fruit flavors such as apricot, prune, pineapple and the like. The types and/or proportions of the adjuvants and other materials may be varied as described to obtain the required flavor character.

The following examples are given to illustrate embodiments of the invention as it is now preferred to practice it. It will be understood that these examples are illustrative and the invention is not to be considered as being limited thereto.

EXAMPLE I

Prop-1-enyl-3,4,5-trimethoxy benzene is prepared by (1) the reaction allyl chloride with 1,2,3-trimethoxy benzene in the presence of $PdCl_2$-(pyridine)$_2$ complex catalyst followed by (2) rearrangement using sodium hydroxide. Distillation yields the product as a water white mobile liquid having a boiling point of 153–6° C. at 10 mm. Hg, a density at 20° C. of 1.077 and an $n_D^{20}$ of 1.547.

The following concentrate is prepared:

| Ingredient— | Percent |
|---|---|
| Geraniol | 1.00 |
| Ethyl methyl phenyl glycidate | 3.33 |
| 2-methyl-2-pentenoic acid | 4.77 |
| Vanillin | 5.66 |
| Ethyl pelargonate | 13.06 |
| Isoamyl acetate | 14.00 |
| Ethyl butyrate | 57.18 |
| 1-(prop-1'-enyl) - 3,4,5 - trimethoxy benzene (prepared as above) | 1.00 |

EXAMPLE II

The following concentrate is prepared as follows:

| Ingredient— | Percent |
|---|---|
| Napthyl ethyl ether | 0.96 |
| Ethyl methyl phenyl glycidate | 2.88 |
| Vanillin | 2.66 |
| 2-methyl-2-pentenoic acid | 3.90 |
| Ethyl acetate | 9.58 |
| Isoamyl butyrate | 12.25 |
| Ethyl butyrate | 26.20 |
| Isoamyl butyrate | 40.57 |
| 1-(prop-1'-enyl)-3,4,5-trimethoxy benzene | 1.00 |

EXAMPLE III

The concentrate prepared in Example I is dissolved in four times its volume of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without the 1-(prop-1'-enyl)-3,4,5-trimethoxy benzene in the concentrate, it is found to have a strawberry flavor having lesser fullness and body and lacking in woody notes.

EXAMPLE IV

The propylene glycol solution of the concentrate prepared as in Example II is added to a simple syrup at the rate of 8 oz. per gallon of syrup. The syrup is acidified by the addition of 1.5 oz. of 50% aqueous citric acid solution to each gallon of syrup. A carbonated beverage is prepared by mixing one oz. of the flavored, acidified syrup with five oz. of carbonated water. The beverage so prepared has an excellent fresh strawberry flavor, and is found to be markedly superior to a beverage prepared in the same manner but without the 1-(prop-1'-enyl)-3,4,5-trimethoxy benzene.

EXAMPLE V

The flavor concentrate prepared in Example II is admixed with gum arabic in the proportion of 7 lbs. of concentrate to 28 lbs. of gum arabic in 65 lbs. of water, and the aqueous mixture is spray-dried. The flavor concentrate carrier combination so obtained is then added to a gelatin dessert mix in the ratio of 1 oz. of spray-dried material to 100 lbs. of dessert mix powder. The gelatin dessert produced from the mix has an excellent strawberry flavor and is markedly superior to a gelatin dessert prepared in the same manner without the 1-(prop-1'-enyl)-3,4,5-trimethoxy benzene in the concentrate.

EXAMPLE VI 1-(but-2'-enyl)-3-hydroxy-2,6-diethoxy benzene is prepared by the alkenylation of 2,6-diethoxy phenol with butadiene in the presence of a palladium chloride catalyst. The resultant product is then etherified with dimethyl sulfate forming 1-(but-2'-enyl)-3-methoxy 2,6-diethoxy benzene; a water-white liquid.

The following concentrate is prepared:

| Ingredient— | Percent |
|---|---|
| Geraniol | 1.00 |
| Ethyl methyl phenyl glycidate | 3.33 |
| 3-methyl-2-pentenoic acid | 4.77 |
| Vanillin | 5.66 |
| Ethyl pelargonate | 13.06 |
| Isoamyl acetate | 14.00 |
| 1-(but-2'-enyl)-3-methoxy-2,6-diethoxy benzene | 1.00 |
| Ethyl butyrate | 57.18 |

EXAMPLE VII

The following concentrate is prepared:

| Ingredient— | Percent |
|---|---|
| Naphthyl ethyl ether | 0.96 |
| Vanillin | 2.66 |
| Ethyl methyl phenyl glycidate | 2.88 |
| 2-methyl-2-pentenoic acid | 3.90 |
| Ethyl acetate | 9.58 |
| Isoamyl acetate | 12.25 |
| Ethyl butyrate | 26.20 |
| Isoamyl butyrate | 30.57 |
| 1-(prop-1'-enyl)-3,4,5-trimethoxy benzene | 1.00 |

EXAMPLE VIII

The concentrate prepared in Example VI is dissolved in four times its volume of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without the 1-(but-2'-enyl)-3-methoxy-2,6-diethoxy benzene in the concentrate it is found to have a strawberry flavor having lesser fullness and body and lacking in woody notes.

EXAMPLE IX

The propylene glycol solution of the concentrate prepared as in Example VIII is added to a simple syrup at the rate of 1.8 oz. per gallon of syrup. The syrup is acidified by the addition of 1.5 oz. of 50% aqueous citric acid solution to each gallon of syrup. A carbonated beverage is prepared by admixing 1 oz. of the flavored, acidified syrup with 5 oz. of carbonated water. The beverage so prepared has an excellent fresh strawberry flavor, and is found to be markedly superior to a beverage prepared in the same manner but without the 1-(but-2'-enyl)-3-methoxy-2,6-diethoxy benzene.

EXAMPLE X

The flavor concentrate prepared in Example VII is admixed with gum arabic in the proportion of 7 lbs. of concentrate to 28 lbs. of gum arabic in 65 lbs. of water, and the aqueous mixture is spray-dried. The flavor concentrate carrier combination so obtained is then added to a gelatin dessert mix in the ratio of 1 oz. of spray-dried material to 100 lbs. of dessert mix powder. The gelatin dessert produced from the mix has an excellent strawberry flavor and is markedly superior to a gelatin dessert prepared in the same manner without the 1-(prop-1'-enyl)-3,4,5-trimethoxy benzene in the concentrate.

EXAMPLE XI

A purified sample of 1-(prop-1'-enyl)-3,4,5-trimethoxy benzene is prepared by the reaction of 3,4,5-trimethoxy benzaldehyde with triphenyl phosphonium ethyl iodide in the presence of butyl lithium, and benzene-tetrahydrofuran as solvent. After distillation, the product has a boiling point of 153°–6° C. at 10 mm. Hg, a density at 20°

C. of 1.077 and an $n_D^{20}$ of 1.547. It is a water-white viscous liquid.

The following concentrate is prepared:

| Ingredient— | Percent |
|---|---|
| Geraniol | 1.00 |
| Ethyl methyl phenyl glycidate | 3.33 |
| 2-methyl-2-pentenoic acid | 4.77 |
| Vanillin | 5.66 |
| Ethyl pelargonate | 13.06 |
| Isoamyl acetate | 14.00 |
| Ethyl butyrate | 57.18 |
| 1-prop-1'-enyl)-3,4,5-trimethoxy benzene (prepared as above) | 1.00 |

EXAMPLE XII

The concentrate prepared in Example XI is dissolved in four times its volume of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without the prop-1-enyl-3,4,5-trimethoxy benzene in the concentrate, it is found to have a strawberry flavor having lesser fullness and body and lacking in woody notes.

EXAMPLE XIII

A purified sample of 1-(but-1'-enyl)-3,4,5-triethoxy benzene is prepared by the "Wittig" reaction of 3,4,5-triethoxy benzaldehyde with triphenyl phosphonium butyl bromide in the presence of a mixture of potassium-t-butoxide and dimethyl sulfoxide and a benzene tetrahydrofuran solvent. After distillation, the product (by infrared and NMR and mass-spectral analysis) is shown to have the following structure:

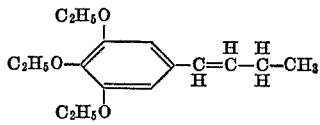

The following concentrate is prepared:

| Ingredient— | Percent |
|---|---|
| Geraniol | 1.00 |
| Ethyl methyl phenyl glycidate | 3.33 |
| 2-methyl-2-pentenoic acid | 4.77 |
| Vanillin | 5.66 |
| Ethyl pelargonate | 13.06 |
| Isoamyl acetate | 14.00 |
| Ethyl butyrate | 57.18 |
| 1-(but-1'-enyl)-3,4,5-triethoxy benezene (prepared as above) | 1.00 |

EXAMPLE XIV

The concentrate prepared in Example XIII is dissolved in four times its volume of propylene glycol and the mixture is added to a hard candy melt at the rate of 1.5 oz. of the concentrate solution per 100 lbs. of melt. After the finished candy has been produced, it is found to have an excellent strawberry flavor. When the candy is compared with candy made under the same conditions, but without the 1-(but-1'-enyl)-3,4,5-triethoxy benzene in the concentrate, it is found to have a strawberry flavor having lesser fullness and body and lacking in woody notes.

What is claimed is:

1. A process for altering the flavor of a foodstuff which comprises incorporating in a foodstuff a small but effective amount of 1-(prop-1'-enyl)-3,4,5-trimethoxy benzene.

2. The process of claim 1 wherein the amount of said 1-(prop-1'-enyl)-3,4,5-trimethoxy benzene is in a concentration of from 0.5 p.p.m. up to about 25 p.p.m. based on the total weight of said foodstuff.

3. A flavor modifying composition consisting essentially of an ingestibly acceptable flavoring adjuvant and 1-(prop-1'-enyl)-3,4,5-trimethyl benzene, said 1-(prop-1'-enyl)-3,4,5-trimethoxy benzene being present in amounts sufficient to alter the flavor of a foodstuff in which it is incorporated.

4. A composition according to claim 3 wherein said flavoring adjuvant comprises a thickener, stabilizer, surface active agent, conditioner or flavoring intensifier.

5. A composition according to claim 3 wherein said 1-(prop-1'-enyl)-3,4,5-trimethoxy benzene is present in amounts ranging from about 1–20% by weight of total composition.

6. A process for altering the fruit flavor of a foodstuff having such fruit flavor which comprises incorporating in the foodstuff a small but effective amount of 1-(prop-1'-enyl)-3,4,5-trimethoxy benzene.

7. A process for altering the strawberry flavor of a foodstuff having a strawberry flavor which comprises incorporating in the foodstuff a small but effective amount of 1-(prop-1'-enyl)-3,4,5-trimethoxy benzene.

References Cited

UNITED STATES PATENTS 3,499,769   3/1970   Kratz et al. _____ 99—140

OTHER REFERENCES

Chemicals Used in Food Processing, National Academy of Sciences—National Research Council—publication 1274—Washington, D.C. (1965), pp. 125, 227, 228.

Dictionary of Organic Compounds, 4th ed. (1965), Oxford University Press, New York, vol. 3, p. 1337.

Moncrieff: The Chemistry of Prefumery Materials, United Trade Press, London (1949), pp. 24, 25, 148, 149.

MORRIS O. WOLK, Primary Examiner

W. BOVEE, Assistant Examiner

U.S. Cl. X.R.

99—28, 134, 139